US008055276B2

(12) United States Patent
Otto

(10) Patent No.: US 8,055,276 B2
(45) Date of Patent: Nov. 8, 2011

(54) CRISIS RESPONSE SYSTEM INCLUDING CELL JAMMING DEVICE

(76) Inventor: Kevin L. Otto, Milwaukee, WI (US)

( * ) Notice: Subject to any disclaimer, the term of this patent is extended or adjusted under 35 U.S.C. 154(b) by 565 days.

(21) Appl. No.: 11/532,175

(22) Filed: Sep. 15, 2006

(65) Prior Publication Data

US 2010/0255771 A1 Oct. 7, 2010

Related U.S. Application Data

(60) Provisional application No. 60/718,478, filed on Sep. 19, 2005.

(51) Int. Cl.
*H04W 24/00* (2009.01)

(52) U.S. Cl. ...... 455/456.4; 455/1; 455/404.1; 455/567; 455/103; 340/539.17; 340/539.1

(58) Field of Classification Search ........... 455/1, 404.1, 455/450; 340/521, 540, 573.1
See application file for complete search history.

(56) References Cited

U.S. PATENT DOCUMENTS 6,112,052 A * 8/2000 Guthrie et al. .................... 455/1
6,442,240 B1 * 8/2002 Otto ................................ 379/37
6,456,822 B1 * 9/2002 Gofman et al. ................... 455/1
6,496,703 B1 * 12/2002 da Silva ..................... 455/456.4
6,556,810 B2 * 4/2003 Suzuki ............................ 455/88
6,978,146 B1 * 12/2005 Yardman .................... 455/456.4
7,050,755 B2 * 5/2006 Kline ................................ 455/1
7,423,528 B2 * 9/2008 Otto ......................... 340/539.17
2004/0192362 A1 * 9/2004 Vicari ........................... 455/507

FOREIGN PATENT DOCUMENTS

WO WO 98/18232 * 4/1998

OTHER PUBLICATIONS

"Cell Phone Jammer", Global Gadget UK website, admitted prior art.

* cited by examiner

*Primary Examiner* — Rafael Pérez-Gutiérrez
*Assistant Examiner* — Lameka J. Kirk
(74) *Attorney, Agent, or Firm* — Andrus, Sceales, Starke & Sawall, LLP

(57) ABSTRACT

A crisis response system including a throw module and a command unit connected by a communication cable. The throw module includes at least one covert video camera hidden from view. The covert video camera provides a video signal to the command unit showing the current conditions that exist in the immediate area surrounding the throw module. The throw module further includes a covert microphone hidden within the throw module that transmits an audio signal including the sounds occurring the immediate vicinity of the throw module. The crisis response system includes a cellular phone jamming circuit contained within the throw module that is selectively activated by a switch contained on the command unit. The cellular phone jamming circuit prevents cellular communication within a prescribed radius surrounding the throw phone.

16 Claims, 5 Drawing Sheets

FIG. 4
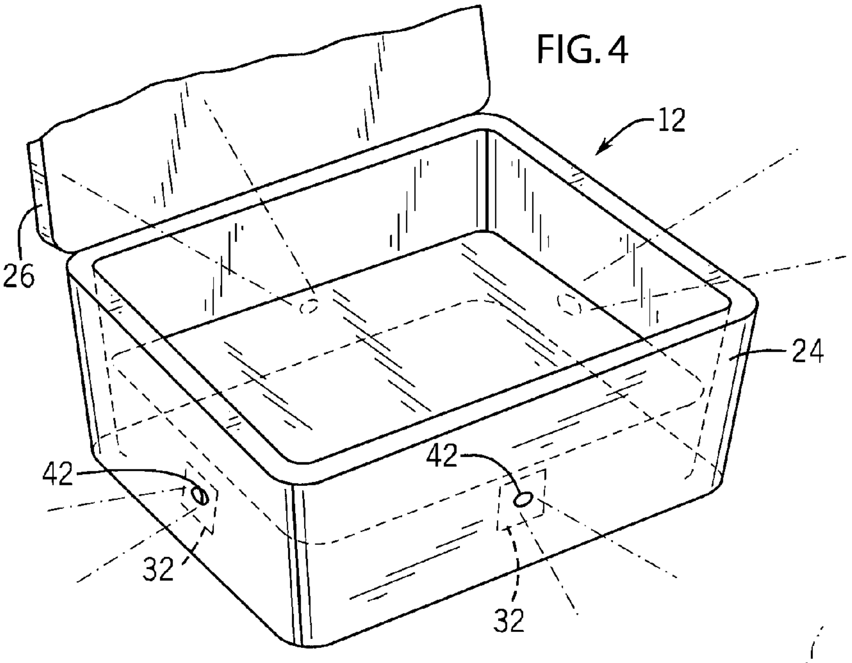
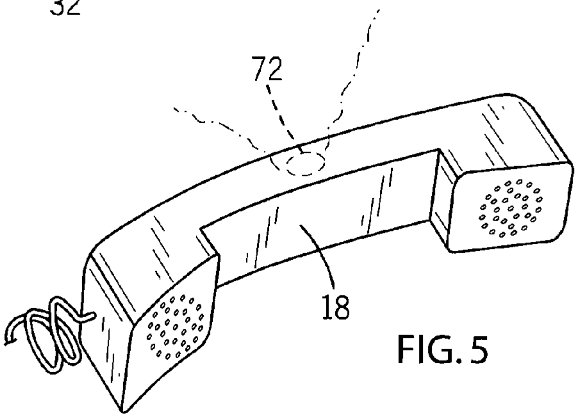
FIG. 5
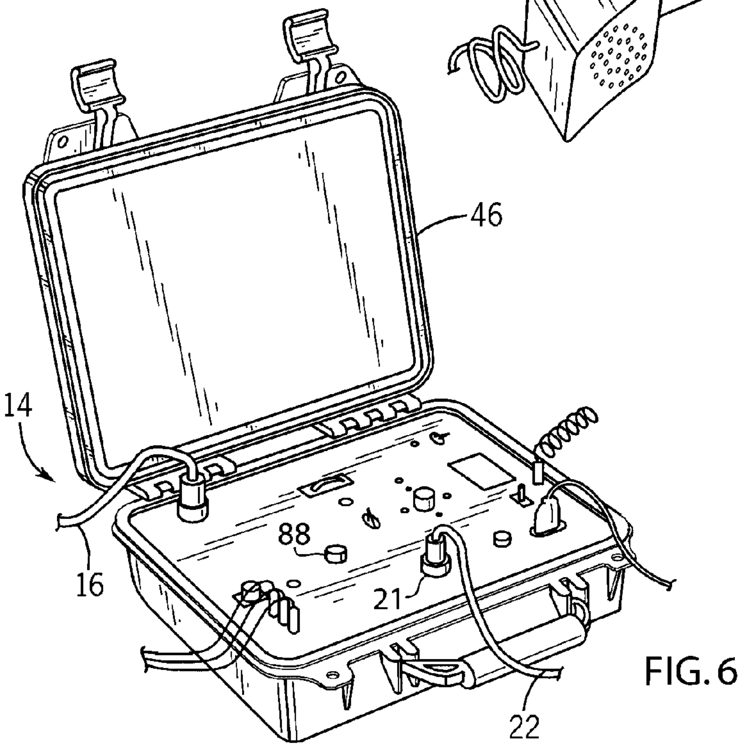
FIG. 6

CRISIS RESPONSE SYSTEM INCLUDING CELL JAMMING DEVICE

CROSS REFERENCE TO RELATED APPLICATION

The present application is based on and claims priority to U.S. Provisional Patent Application Ser. No. 60/718,478, filed Sep. 19, 2005.

BACKGROUND OF THE INVENTION

The present invention relates to a hostage negotiation system to provide secure communication between a law enforcement agent and an extortionist. More specifically, the invention relates to a crisis response system including numerous covert features to provide additional information to the law enforcement agent and a hidden cell phone jamming device that can be remotely activated by the law enforcement agent.

Law enforcement agencies are frequently confronted with situations in which an extortionist has barricaded himself in a particular location and it is impractical for the police to enter that location for an arrest without risking the safety of hostages or those in the immediate vicinity, including the officers. In this type of situation, it is often times necessary for the law enforcement agency to communicate with the extortionist in order to determine the extortionist's demands and requests.

In the past, many types of negotiation units have been used in connection with existing telephone wires to speak with the extortionist. In these types of situations, the law enforcement agency typically taps into the existing phone wires and the extortionist uses the telephone located in the building in which the hostages are being held. However, this type of crisis response unit has several drawbacks, in that the communication with the extortionist may not be secure or there may not be an existing telephone in the building in which hostages are being held.

To address several of these problems, direct connected crisis response negotiation systems including two telephone handsets hard wired together are used. In this type of system, one of the handsets is thrown into the building, while the second handset is retained by the law enforcement agency. Through this hard wire connection, the law enforcement agency can contact and communicate with the extortionist holding the hostages.

While this type of system has worked reasonably well, it is desired to enhance the crisis response system to provide the law enforcement agency with additional information to enhance the position of the law enforcement agency in any hostage negotiation that may occur.

One example of an improved crisis response system is shown and described in U.S. Pat. No. 6,442,240 entitled "Hostage Negotiation System" and assigned to Professional Safety, Inc., the assignee of the present disclosure. The '240 patent is incorporated herein by reference.

In the crisis response system of the '240 patent, the command unit used by the law enforcement agency is hard wired to a throw module that is provided to the extortionist. The throw module includes at least one covert video camera that provides video feedback to the command unit that can be monitored by the law enforcement agency. The crisis response system further includes at least one covert microphone in the throw module such that the law enforcement agency at the command unit can receive audio signals from within the hostage situation without the extortionist's knowledge. During normal usage of the crisis response system, the extortionist communicates with the law enforcement agency over the telephone handset provided in the throw module such that the communication between the law enforcement agency and the extortionist is controlled.

Oftentimes during a hostage situation, the law enforcement agency severs the land communication link to the building in which the hostage is being held. This step eliminates the possibility of the extortionist communicating to outside of the building and focuses the entire communication to the communication taking place over the crisis response system.

Presently, cellular phones have become common place and it is very likely that an extortionist will have a cell phone with him or her during the negotiation process. Therefore, it is desirable for the law enforcement agency to have a means and device to prevent cellular phone communication by the extortionist during the hostage negotiations.

Various other features, objects and advantages of the invention will be made apparent from the following description taken together with the drawings.

SUMMARY OF THE INVENTION

The present invention is a crisis response system that allows a law enforcement agency to securely communicate with an extortionist. The crisis response negotiation system includes a throw module connected to a command unit by a communication cable. The throw module of the crisis response system includes a communication device, such as a telephone handset, that allows the extortionist to speak to a law enforcement agent positioned near the command unit through the self-contained communication system.

The throw module includes a rugged outer casing having a main body portion and a cover. The cover of the outer casing may be clear to allow the extortionist to view the handset before the throw module is opened. The telephone handset is contained within the throw module when the cover is closed.

A covert video camera and a covert microphone may be concealed behind a face plate attached to the cover of the throw module. The face plate includes a plurality of holes to disguise the location of both the covert video camera and the covert microphone. The covert video camera and the covert microphone transmit video and audio signals, respectively, to the command unit through the communication cable.

In addition to the covert video camera mounted either within the cover or the inside of the main body of the throw module, the throw module preferably includes several additional covert video cameras positioned to view outward from the side walls of the main body of the outer casing. The additional covert video cameras allow the law enforcement agency to have a nearly 360° view of the area immediately surrounding the throw module.

The command unit of the crisis response system includes a control panel that allows the law enforcement agency to control the various functions of the crisis response system. The control panel of the command unit includes a covert video jack and a covert audio jack such that the covert audio and video signals can be output to an external monitor. Through the external monitor, the law enforcement agency can monitor the immediate area surrounding the throw module without the extortionist's knowledge. Additionally, a communication port allows others besides the primary negotiator to listen to the conversation between the negotiator and the extortionist.

The command unit further includes a conventional telephone dialing pad, a telephone handset, and output connection such that the command unit can be connected to conventional commercial telephone wires and act as a conventional telephone. In this manner, the command unit can be used to communicate with the extortionist through standard telephone lines.

In addition to the standard features above, the crisis response system includes a cell phone jamming circuit included in the throw phone. The cell phone jamming circuit can be selectively operated from the remote command unit. The jamming circuit operates by flooding the bandwidth used to transmit by most cell phones such that anyone within the operational radius of the cell phone jamming circuit will receive a "no signal" or "extend" display on the cell phone. Thus, the law enforcement agency is able to selectively render the extortionist's cell phone non-functional until the power to the cell phone jamming circuit is disconnected.

BRIEF DESCRIPTION OF THE DRAWINGS

The drawings illustrate the best mode presently contemplated of carrying out the invention. In the drawings:

FIG. 4 is a partial perspective view illustrating the position of additional covert video cameras in the throw module of the crisis response system;

FIG. 5 is a perspective view of a handset including an infrared emitter;

FIG. 6 is a perspective view of the command unit of the crisis response crisis response system;

DETAILED DESCRIPTION OF THE INVENTION

Figure 1:
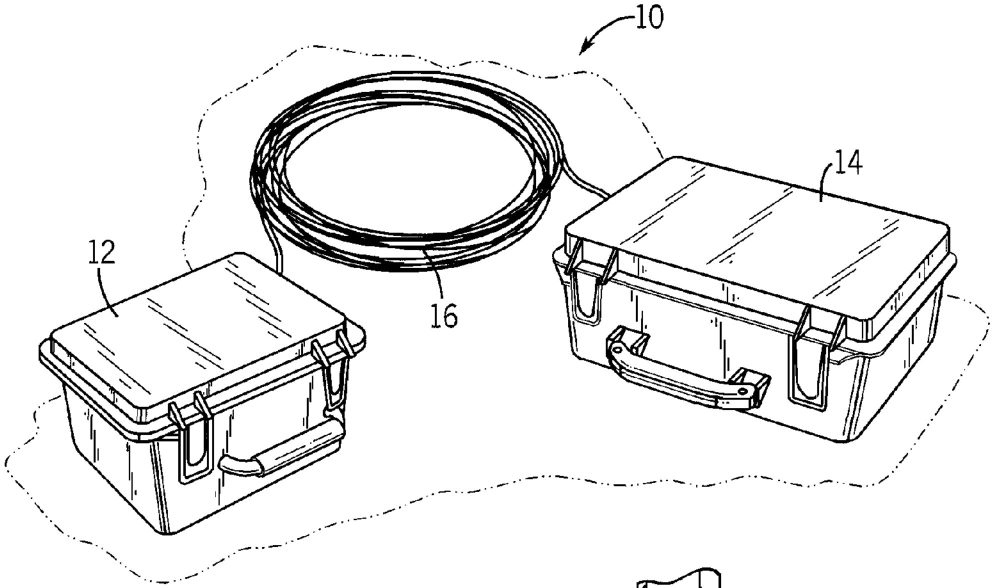
FIG. 1 illustrates a crisis response system of the present invention, including a throw module and a command unit joined by a communication cable.

FIG. 1 illustrates the crisis response system 10 of the present invention. The crisis response system 10 includes a throw module 12 and a command unit 14 preferably joined to one another by a communication cable 16. The communication cable 16 allows the throw module 12 to communicate directly to the command unit 14 without external wiring separate from the crisis response system 10. In a contemplated alternate embodiment, the throw module 12 and the command unit 14 can be configured to communicate using wireless communication techniques. In use, the throw module 12 is thrown into a building in which hostages are being held or some other type of emergency situation exists. After the throw module 12 has been deployed, the command unit 14 remains outside the building and is used by law enforcement agents to communicate with the extortionist located within the building.

Figure 2:
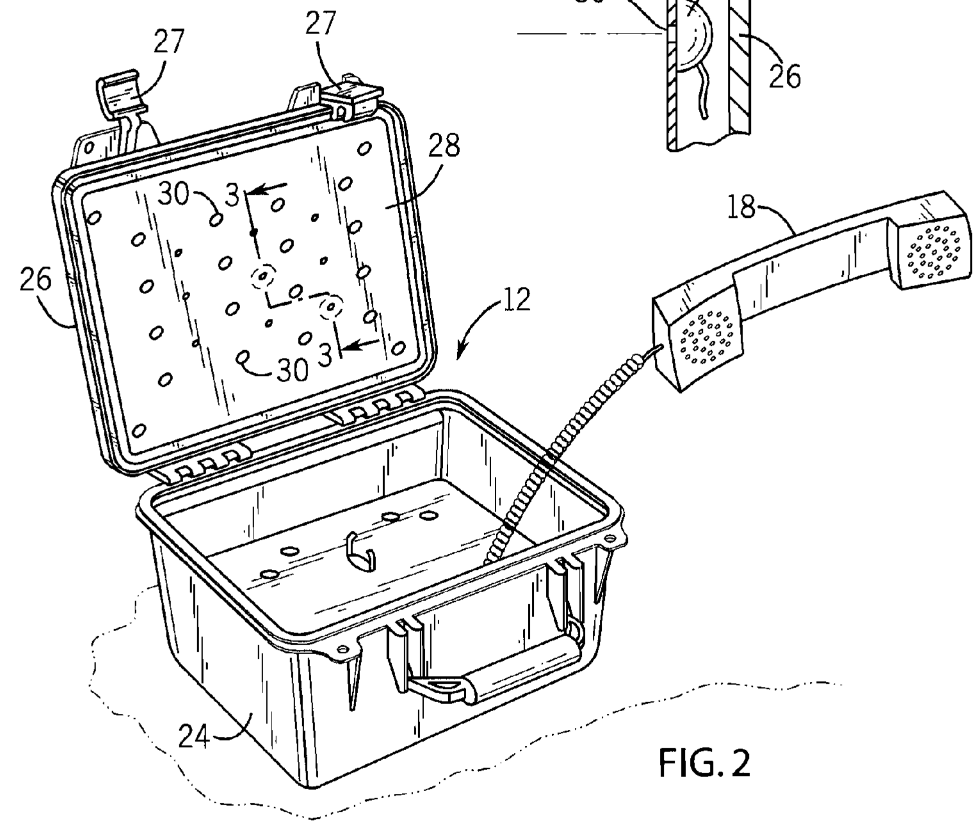
FIG. 2 illustrates the throw module of the crisis response system in the open position.
Figure 7:
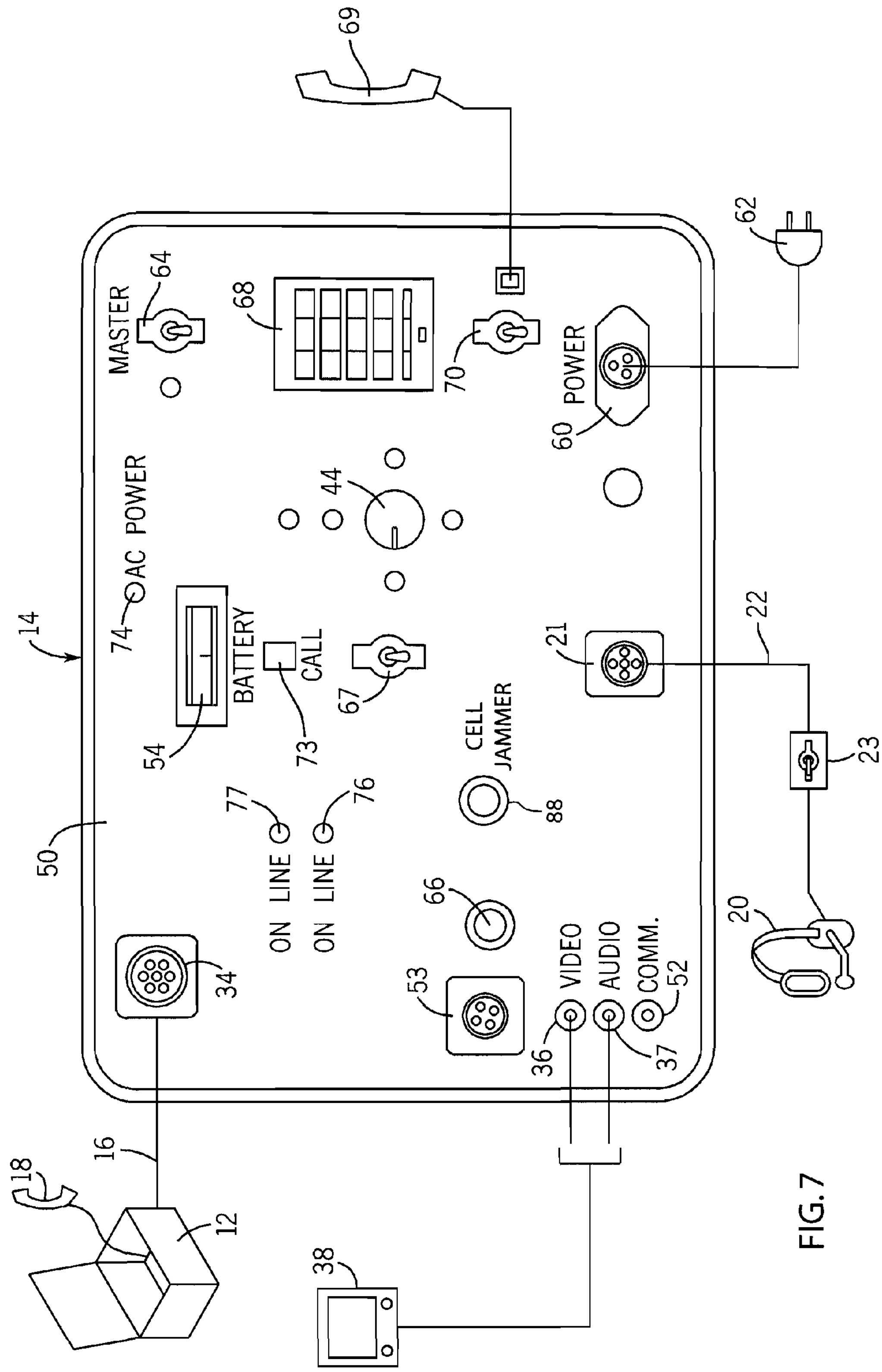
FIG. 7 is a top view illustrating the various controls and indicators on the command unit.

Referring now to FIG. 2, the throw module 12 includes a telephone handset 18, while the command unit 14 shown in FIGS. 6 and 7 includes a hands-free headset 20 joined to a headset port 21 on the command unit 14 by a cord 22. As can be seen in FIG. 7, an on/off switch 23 is positioned between the primary negotiator headset 20 and the command unit 14 that allows the primary negotiator to selectively turn off the microphone on the headset 20 such that the extortionist cannot hear private conversations taking place between the law enforcement agents. In the preferred embodiment of the invention, the headset includes a pair of ear cuffs and a boom microphone to reduce the fatigue of the primary negotiator during extended negotiation periods. Additionally, the headset 20 includes a volume selector that allows the negotiator to control the volume of the headset 20.

In the preferred embodiment of the invention, the communication cable 16 joining the command unit 14 to the throw module 12 is a 100 foot category 5 communication cable, with the possibility of a 400 foot add-on spool to increase the range of the crisis response system 10. Additionally, another spool of cable, having a length of 2000 feet or more, can also be used to extend the range of the crisis response system 10. In the preferred embodiment of the invention, the communication cable 16 includes a length of cut resistant cable near the throw module 12 to prevent the extortionist from severing the communication cable 16.

As discussed above, in a contemplated alternate embodiment of the invention, the communication cable 16 can be replaced by wireless communication between the command unit 14 and the throw module 12. It is contemplated that both the command unit 14 and the throw module 12 could include a wireless transceiver that allows the command unit and the throw module to communicate to each other without any communication cable joining the two units. It is contemplated that the wireless communication between the command unit and the throw module would take place at a different frequency from normal cellular telephones and would be secure to prevent any tapping into the communication between the extortionist and the law enforcement personnel.

Referring now to FIG. 2, the throw module 12 of the preferred embodiment includes a rugged, virtually indestructible outer casing having a main body portion 24 and a cover 26. As can be seen in FIG. 2, the cover 26 includes a pair of latches 27 that secure the cover 26 in the closed position to facilitate throwing of the module 12. The inner surface of the cover 26 includes a generally flat face plate 28 that faces outward when the cover 26 is opened. The face plate 28 includes a plurality of holes 30 spaced along the generally flat surface of the face plate 28.

In a current embodiment of the invention, the cover 26 can be made of clear plastic to allow the extortionist to view the interior of the throw module. The clear cover would allow the extortionist to view the handset contained within the throw module prior to the throw module being opened.

Figure 3:
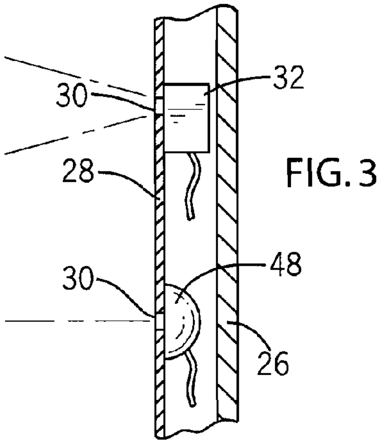
FIG. 3 is a section view taken along line 3-3 of FIG. 2 illustrating the general mounting arrangement of a covert video camera and a covert microphone behind the face plate of the throw module.

Referring now to FIG. 3, in the preferred embodiment of the invention, a covert video camera 32 is positioned behind one of the holes 30 formed in the face plate 28. The numerous holes 30 formed in the face plate 28 aid in deceiving the extortionist as to the presence of the covert video camera 32. When the cover member 26 is opened as shown in FIG. 2, the covert video camera 32 is able to view the area around the throw module 12 and transmit video signals through the communication cable 16 back to the command unit 14.

Referring now to FIGS. 6 and 7, the command unit 14 includes a throw module interface 34 that receives the communication cable 16 joining the throw module 12 to the command unit 14. The command unit receives the video signals from the covert video camera 32 through the communication cable 16 connected to the throw module interface 34.

In addition to the throw module interface 34, the command unit 14 includes a covert video jack 36 and a covert audio jack 37 that can be connected to an external monitor 38 to display the video signals received from the covert video camera 30.

In addition to the single covert video camera 32 mounted behind the face plate 28, it is contemplated by the inventors that a plurality of covert video cameras 32 could be mounted in various walls of the main body portion 24 of the throw module 12, as best shown in FIG. 4. In the embodiment of the invention shown in FIG. 4, a covert video camera 32 is mounted behind each camera opening 42 formed in the side walls of the main body portion 24. Each of the covert video cameras 32 mounted behind one of the side walls of the main body portion 24 faces outward and provides a view of the area surrounding the throw module 12. The plurality of covert video cameras 32 mounted within the main body portion 24 of the throw module 12 in the manner shown, combined with the covert video camera 32 behind the face plate 28, allow the law enforcement agency to have an almost 360° view around the throw module 12 without the extortionist's knowledge.

Referring back to FIGS. 6 and 7, the command unit 14 includes a camera selector 44 that allows the law enforcement agency to select which of the video feeds from the plurality of covert video cameras is displayed upon the monitor 38. Alternatively, all five of the video signals could be simultaneously displayed on a single monitor screen by using a signal splitter. In a system having the five separate covert video cameras 32 shown, the law enforcement agency can view the entire area surrounding the extortionist without the extortionist's knowledge.

In the embodiment of the invention shown in FIG. 7, the command unit 14 is connected to an external monitor 38 through the covert video jack 36 and the covert audio jack 37. It should be understood, however, that it is contemplated by the inventors to include a monitor mounted in the control panel 50 of the command unit 14 such that the entire command unit 14 would be a self-contained unit without the requirement of external components, such as the external monitor 38.

Referring back to FIG. 3, the throw module 12 includes a super high-gain covert microphone 48 mounted behind one of the holes 30 formed in the face plate 28 of the cover 26. As with the covert video camera 32, the covert microphone 48 is mounted behind one of the plurality of holes 30 such that the plurality of holes disguise the location of both the microphone 48 and the video camera 32. The covert microphone 48 functions independently from the handset 18 and picks up sounds in the area surrounding the throw module 12 completely separate from the audio signal being transferred through the handset 18. Through the covert microphone 48, the law enforcement agency using the command unit 14 can monitor discussions and other communication occurring near the throw module 12 without the extortionist being aware that the law enforcement agency can monitor such discussions. Although the covert microphone 48 is shown mounted in the cover 26, the microphone could be hidden in other locations on the throw module 12 while falling within the scope of the invention.

In addition to the video monitor jacks 36 previously discussed, the control panel 50 of the control unit 14 preferably includes a communication port 52 that can be connected to a tape recorder or speaker system to record and monitor conversations with the extortionist or general discussions taking place around the throw module 12.

A general interface port 53 allows all of the video and audio signals to be transmitted away from the command unit 14 to reduce clutter near the command unit 14. The control panel 50 further includes a voltage meter 54 that indicates the current charge of the internal battery contained within the command unit 14.

The command unit 14 further includes a power input terminal 60 that allows the command unit 14 to be coupled to a conventional AC power source by a plug member 62. A DC adapter, not shown, can be connected to the plug 62 such that the command unit can also be powered by a DC power supply. In this manner, the control unit can be powered by either 120 volt AC current or a 12 volt DC external power supply, such as a car battery.

Further, the control panel 50 of the command unit 14 includes a master ON/OFF switch 64, an auxiliary headset port 66 and a headset power switch 67. The auxiliary headset port 66 allows a headset to be connected to the control unit 14 in addition to the headset 20 such that multiple persons can simultaneously communicate or monitor the conversation to the throw module 12. The headset power switch 67 allows the negotiator to turn off the microphone in his headset such that the extortionist cannot listen in on private conversations taking place near the command unit 14.

The control panel 50 further includes a conventional telephone dialing pad 68 and a telephone handset 69 that allows the command unit 14 to be connected to a conventional land wired telephone system such that the command unit 14 can communicate with the extortionist through a conventional telephone system that may be in the building in which the extortionist is located. The use of the conventional telephone touch pad 68 and handset 69 is controlled by a selector switch 70 that allows the law enforcement agency to select between the connection to the conventional telephone system or use of the communication cable 16 joined between the throw module 12 and the command unit 14. Although the control panel 50 is shown as having a separate dialing pad 68 and a telephone handset 69, it is contemplated by the inventors that the dialing pad 68 and telephone handset 69 could be combined.

In addition to the external power supply, the command unit 14 includes an internal battery that allows the command unit 14 to operate independently of any external power source. The internal battery contained within the command unit 14 typically stores enough power to operate the system for several hours without recharging. During use of the crisis response system with an external power supply, the internal batteries within the command unit 14 are automatically recharged. The command unit 14 supplies power to the throw module 12 through the communication cable 16, such that the components contained within the throw module 12 are powered by the command unit 14.

In an alternate contemplated embodiment in which the command unit 14 communicates to the throw module 12 using wireless communications, the throw module 12 will include a separate battery and voltage regulation circuit to power both the wireless transmitter and the operating components within the throw module 12.

Referring now to FIG. 5, the handset 18 of the throw module 12 is shown including an infrared emitter 72 that functions as a source of infrared light. The infrared light is highly visible by law enforcement agents utilizing conventional night vision scopes or lenses such that during a night time situation, law enforcement agents can view the extortionist without the extortionist realizing there is a source of infrared light present. In addition to the infrared emitter 72, it is contemplated that the handset 18 could include a pulse monitor and/or an intoxication meter. The intoxication meter and pulse monitor would allow the law enforcement agency at the command unit 14 to monitor both the blood alcohol content of the extortionist and his or her pulse rate. The pulse rate indicates the amount of stress the extortionist is under, while the blood alcohol content indicates the degree of sobriety of the extortionist.

The throw module 12 and the command unit 14 both include a "call" button 73. To call the other party, the "call" button is depressed several times. This depression of the "call" button causes the opposite handset to beep. To listen to a conversation, the extortionist simply picks up the telephone handset and listens. To speak to the command unit, the extortionist simply speaks into the microphone in the telephone handset.

In addition to the communication between the throw module 12 and the command unit 14, it is contemplated that the command unit 14 can be configured to communicate with a second throw module through wireless communication. Specifically, communication between the command unit and the second throw module is contemplated as being two-way duplex communication. Preferably, the second type of throw module includes both speakers and microphones to communicate information over a wireless communication link back to the command unit. In such a configuration, the throw module can be presented to an extortionist such that the extortionist can hear commands from the law enforcement personnel and information from the extortionist can be picked up by internal microphones and transmitted by the wireless communication link back to the command unit. In such a system, the throw module includes its own 12-volt, lead-acid battery and voltage regulation circuit, since the throw module is no longer connected to the command unit to receive power.

Figure 8:
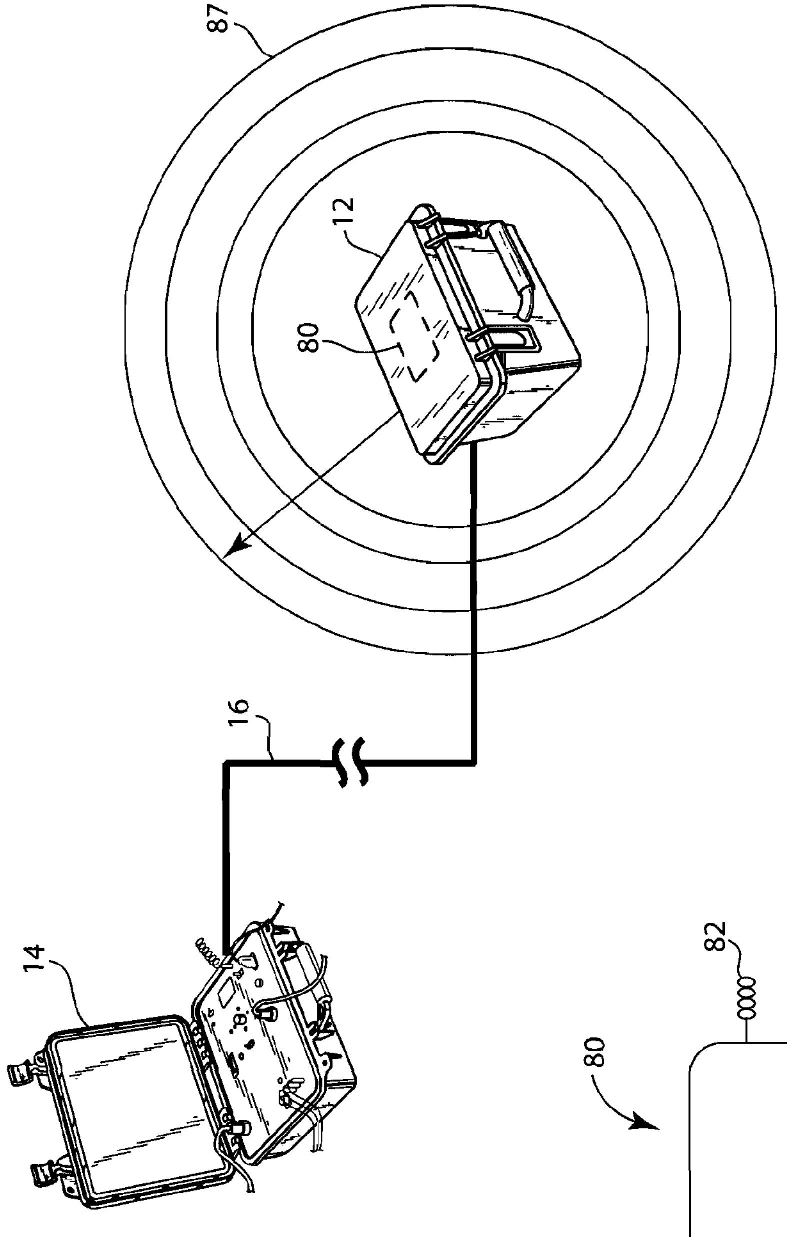
FIG. 8 is a schematic illustration showing the operation of the cell phone jamming circuit to disrupt the operation of a cell phone within a extended radius of operation.

Referring now to FIG. 8, the throw module 12 is shown connected to the command unit 14 through the cable 16. In the embodiment to the invention illustrated in FIG. 8, the throw module 12 includes a cellular phone jamming circuit 80 that is positioned within the enclosure of the throw module 12. The cellular phone jamming circuit 80 is powered through the cable 16 from the internal power supply contained within the command unit 14 in a similar manner the other components contained within the throw module 12.

Figure 8A:
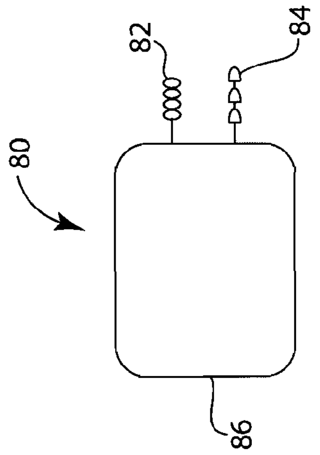
FIG. 8*a* is a schematic illustration of the cell phone jamming circuit.

As seen in FIG. 8*a*, the cellular phone jamming circuit 80 includes a pair of antennas 82, 84 and a driving circuit board 86. The driving circuit board 86 is operable to generate the required signal to be transmitted by the antennas 82, 84 for interrupting cellular communications within an effective radius surrounding the throw phone 12. In the preferred embodiment of the invention, the circuit board 86 operates on 4.8 volts DC and generates output power of between 20-100 mW. In the embodiment of the invention illustrated in FIG. 8, the effective range 87 of the cellular phone jamming circuit is between 40 and 50 feet in optimal conditions, depending upon the building structure and orientation of the throw phone 12. The cellular phone jamming circuit works on the continuous jamming method that generates a jamming signal at both 800 MHz and 1,900 MHz. The pair of antennas 82, 84 are required for providing the signals on the two separate jamming frequencies.

When the jamming circuit 80 is activated, the jamming circuits 80 emits a pair of constant frequency signals and floods the bandwidth used to transmit by most cell phones. When the cellular phone jamming circuit 80 is in operation, a cellular phone within the effective radius 87 of the circuit will display a "no signal" or "extend" message on the phone. At this time, the cellular phone will be incapable of either sending or receiving cellular communications.

Referring back to FIG. 7, the command unit 14 includes a cell jammer activation switch 88 on the control panel 50. The cell jammer switch 80 allows law enforcement agents to selectively activate and deactivate the cell phone jamming circuit 80 from the command unit 14. Thus, the law enforcement agency is able to selectively restrict cellular communications by the extortionist by simply pressing the cell jammer switch 88.

Figure 9:
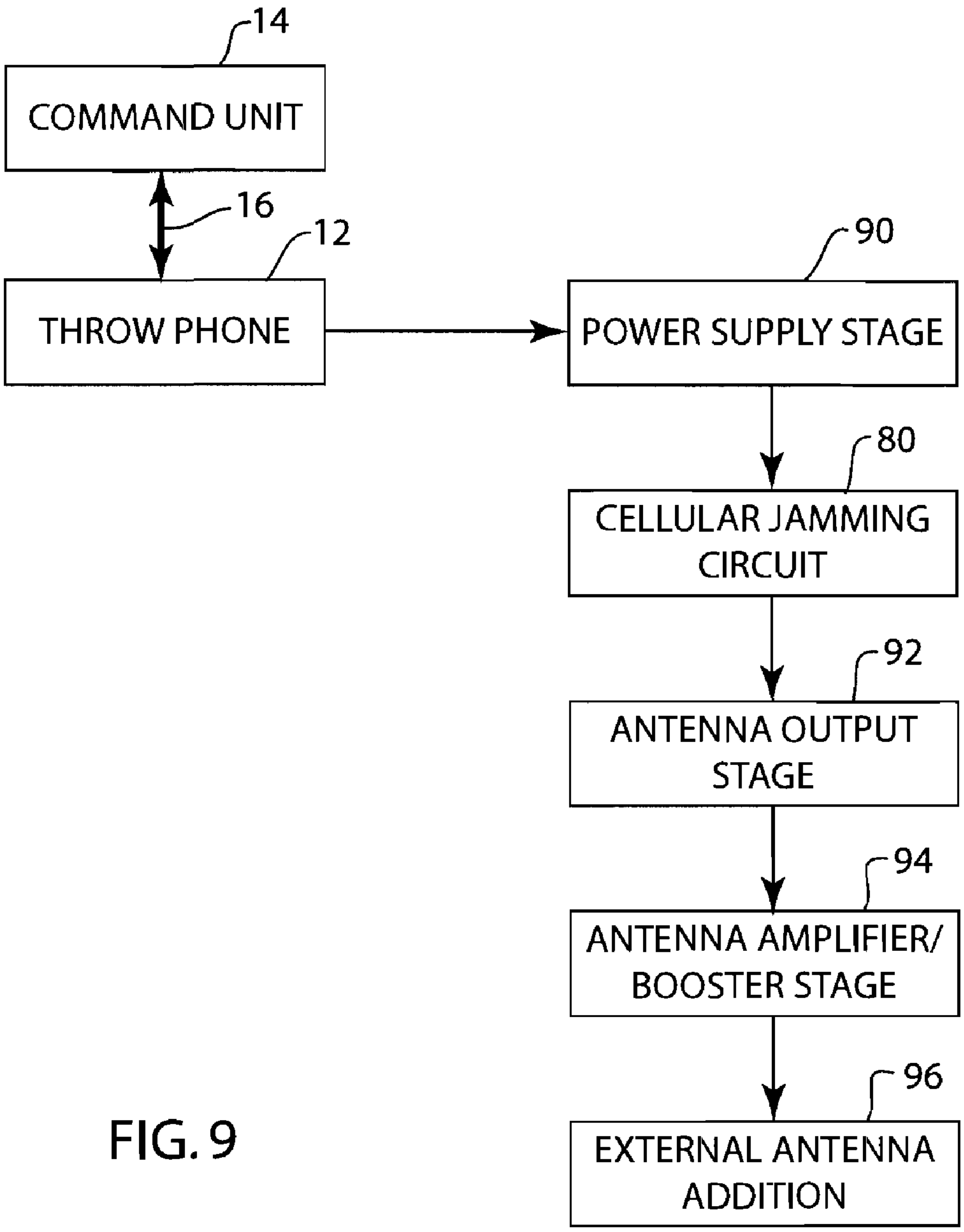
FIG. 9 is a schematic illustration of the operational sequence and flow logic within the throw module used to provide power to the cellular jamming circuit.

Referring now to FIG. 9, the command unit 14 communicates to the throw phone 12 through the cabling 16. The communication cable between the command unit and the throw module both supplies power to the throw module 12 as well as provides electronic communication. As illustrated in FIG. 9, the throw module 12 includes a power supply 90 that is coupled to the cellular phone jamming circuit 80. The cellular phone jamming circuit 80 includes an antenna output stage 92 that generates the specific signals to be broadcast. The signals from the antenna output stage 92 is transferred to an amplifier 94 and eventually broadcasts by the pair of antennas included in the antenna addition circuit 96. Thus, when the cell jammer switch 88 shown in FIG. 7 is depressed, the cell jamming circuit 80 receives power from the throw module and generates two separate, constant signals to prevent cellular phone communication in an area surrounding the throw module 12.

As described previously, in an embodiment in which the command unit 14 communicates to the throw phone 12 using wireless communication techniques, the internal power supply contained within the throw phone provides the required power for operating the cellular jamming circuit 80. In such an embodiment, the wireless communication between the throw phone 12 and the command unit 14 must take place at a frequency other than the frequencies being jammed by the cellular jamming circuit 80. As an example, in the embodiment described, the cellular jamming circuit 80 is continuously broadcasting a jamming signal at both 800 MHz and 1900 MHz. In such an embodiment, the wireless communication between the throw phone 12 and the command unit 14 must be at a different frequency to ensure constant communication between the throw phone 12 and the command unit 14 when the cellular jamming circuit 80 is in operation. In one embodiment of the invention, the communication between the command unit 14 and the throw phone 12 will occur at 900 MHz and will have an operational range of approximately 1000 feet.

The method of using the crisis response system 10 of the present invention will now be described. Before the throw module 12 is given to the extortionist, the 100 feet of communication cable 16 is first attached to the throw module 12. The 100 feet of cable would include the cut-resistant section as previously discussed. After the 100 foot section of cable is attached to the throw module 12, the opposite end of the cable is attached to another 400 feet of cable that is wound upon a separate spool by connecting the male/female adapter plugs. After the two sections of cable are connected, the 400 foot spool of cable is unwound until it reaches the law enforcement command post located externally from the hostage situation. The opposite end of the 400 foot cable is then attached to the black command unit 14 by plugging the adapter plug into the throw module interface 34 on the control panel 50 of the command unit 14. Once the command unit 14 and throw module 12 are connected by the communication cable 16, the crisis response system 10 is ready for use.

The control panel 50 of the command unit 14 includes a variety of indicators and dials to provide feedback to the user. These indicators and dials include: a green light 74 that illuminates when AC/DC power is on, a red light 76 that illuminates when power for the covert video and covert audio is on, a green light 77 that illuminates when the extortionist is on-line, and the voltage meter 54 that indicates when the internal batteries are low. The internal batteries of the control unit 14 are used to operate both the throw module 12 and control unit 14. If the internal batteries fall below a minimum threshold value, the user must recharge the internal batteries. In the preferred embodiment of the invention, the internal batteries can be recharged in a relatively short time period, even when the crisis response system 10 is in use.

In addition to the indicators and dials mentioned above, control panel 50 includes the covert video (CV) port 36. The covert video port 36 permits connection between the command unit 14 and the "video in" jack on a TV monitor, VCR or other video component. This allows police to view video delivered by the hidden cameras in the throw module 12. The communication port 52 can be connected by means of a cable to the "audio in" jack in a tape recorder, speaker, monitor, VCR, etc. This allows police to listen to the conversations occurring over the telephone handsets 18 and 20 between the negotiator and the extortionist. The covert audio (CA) port 37 allows the command unit 14 to be connected to the "audio in" jack on a tape recorder, monitor, VCR, etc. This allows police to listen to conversations occurring in the extortionist's area that are picked up by the hidden microphone 48 located in the throw module 12. The covert audio picks up noise/conversations in the extortionist's area even when the telephone handset is not in use.

Once the command unit 14 and throw module 12 are properly connected by the communication cable 16, the user inserts an AC plug 62 into the AC power source. If desired, a DC adapter can be used to allow the command unit 14 to be powered by a DC power source, such as an auto cigarette lighter. Once power is supplied, the covert video port 36, phone audio port 52, and covert audio ports 37 are connected to the desired electronics enabling both video and audio received by the covert microphone 48, covert video cameras 32, and telephone handsets to be electronically stored on a suitable media. Once the ports are properly connected, the master power switch 64 is depressed to activate the covert audio and video. When activated, the red light 76 on the control panel 50 will illuminate, indicating that covert audio and video are functioning. Once operating, the top cover 26 of the throw module 12 is opened to determine whether the covert video camera 32 is operating properly. Additionally, without using the telephone handset 18, the user generates a sound in a normal voice to assure that the covert audio microphone 48 is operating properly. Next, both the handset 18 and the headset 20 are operated to assure proper operating functions for the crisis response system 10.

After the crisis response system 10 has been properly tested, the throw module 12 is delivered to the desired location. In the preferred embodiment of the invention, the throw module 12 includes rubber shock absorbers located on the outside corners of the throw module 12 to protect the throw module 12 if it is thrown through a window or door.

Once the throw module 12 is in the building occupied by the extortionist, the call button 73 on the command unit 14 is activated to cause the throw module 12 to beep, thereby indicating to the extortionist that an incoming call is being received. In an alternate embodiment of the invention, the throw module 12 can include a light that flashes to indicate that an incoming call has been received by the throw module 12.

Once the extortionist notices the incoming call, the extortionist opens the cover member 26 of the throw module 12 and picks up the handset 18 to speak with the law enforcement agent at the command unit 14. Once the cover member 26 has been opened, both the covert audio and covert video systems included in the throw module 12 relay covert audio and covert video signals to the command unit 14 through the communication cable 16. Additionally, the other features included in the throw module, such as the intoxication meter and pulse monitor, relay information to the command unit 14.

If, after the extortionist receives the throw module 12 the law enforcement agent believes the extortionist may be using a cellular phone to communicate to other persons remote from the hostage situation, the law enforcement agent can depress the cell jammer switch 88 contained on the control unit 14. When the cell jammer switch 88 is depressed, the cellular phone jamming circuit 80 contained within the throw module 12 is activated to disrupt cellular communication within an approximate 40-50 foot radius from the throw module 12. Once activated, the cell phone jamming circuit 80 prevents cellular communication within the effective radius of the cell phone jamming circuit. However, when the cell phone jamming circuit is activated, cellular communications outside of the effective radius are still possible, such that the use of cellular phones by the law enforcement agents is not adversely effected.

As the above-identified description clearly indicates, the crisis response negotiation system 10 of the present invention includes numerous features in addition to the telephone communication between the throw module 12 and the command unit 14. These features, many of which are covert, allow the negotiator to monitor the extortionist without the knowledge of the extortionist. In this manner, the law enforcement officials can make better decisions to aid in ending the hostage situation.

Various alternatives and embodiments are contemplated as being within the scope of the following claims particularly pointing out and distinctly claiming the subject matter regarded as the invention.

I claimed:

1. A crisis response system comprising:

a throw module including a handset and a first communication device;

a command unit in communication with the handset of the throw module, the command unit including a second communication device such that the first communication device communicates with the second communication device; and a cellular phone jamming circuit covertly concealed within the throw module, the cellular phone jamming circuit being selectively and remotely activated from the command unit to transmit at least one jamming signal at a first jamming frequency upon remote activation to disrupt cellular communication on the first jamming frequency within an effective radius surrounding the throw module while simultaneously allowing communication between the first and second communication devices during activation of the cellular phone jamming circuit.

2. The crisis response system of claim 1 further comprising a communication cable connected between the throw module and the command unit such that the first communication device communicates to the second communication device through the communication cable.

3. The crisis response system of claim 2 wherein the cellular phone jamming circuit receives power from the command unit through the communication cable.

4. The crisis response system of claim 1 wherein the first communication device is a first wireless transceiver and the second communication device is a second wireless transceiver such that the throw module communicates with the command unit using wireless communication over a transmission frequency.

5. The crisis response system of claim 4 wherein the cellular phone jamming circuit is operable to prevent cellular communication on at least the first jamming frequency, where the first jamming frequency is different from the transmission frequency.

6. The crisis response system of claim 5 wherein the cellular phone jamming circuit transmits a second jamming signal at a second jamming frequency different from both the first jamming frequency and the transmission frequency to prevent cellular communication over the first and second jamming frequencies while allowing communication over the transmission frequency.

7. The crisis response system of claim 6 wherein the cellular phone jamming circuit prevents communication at 800 MHz and 1,900 MHz.

8. The crisis response system of claim 4 wherein the throw module includes a self-contained power supply.

9. The crisis response system of claim 1 wherein the cellular phone jamming circuit prevents cellular communication over at least two separate jamming frequencies.

10. The crisis response system of claim 9 wherein the cellular phone jamming circuit prevent communication at 800 MHz and 1,900 MHz.

11. A crisis response system comprising:

a throw module including a handset;

a command unit in communication with the throw module; and a cellular phone jamming circuit covertly concealed within the throw module, the cellular phone jamming circuit being selectively and remotely activatable from the command unit to transmit at least one jamming signal at a first jamming frequency upon remote activation to disrupt cellular communication on the first jamming frequency within an effective radius surrounding the throw module while simultaneously allowing communication between the first and second communication devices during activation of the cellular phone jamming circuit.

12. The crisis response system of claim 11 wherein the cellular phone jamming circuit transmits a second jamming signal at a second jamming frequency to prevent cellular communication over at least two separate jamming frequencies.

13. The crisis response system of claim 12 wherein the cellular phone jamming circuit prevents communication at 800 MHz and 1,900 MHz.

14. The crisis response system of claim 11 wherein the throw module is connected to the command unit by a communication cable such that the throw module communicates with the command unit through the communications cable.

15. The crisis response system of claim 11 wherein the throw module includes a first wireless transceiver and the command unit includes a second wireless transceiver such that the throw module communicates with the command unit using wireless communication over a transmission frequency.

16. The crisis response system of claim 15 wherein the cellular phone jamming circuit is operable to prevent cellular communication on at least two separate jamming frequencies, wherein the at least two separate jamming frequencies are different from the transmission frequency.

* * * * *